(12) United States Patent
Nazari et al.

(10) Patent No.: US 12,588,084 B2
(45) Date of Patent: Mar. 24, 2026

(54) METHODS AND APPARATUS SUPPORTING DYNAMIC ETHERNET VLAN CONFIGURATION IN A FIFTH GENERATION SYSTEM

(71) Applicant: Telefonaktiebolaget LM Ericsson (publ), Stockholm (SE)

(72) Inventors: Ala Nazari, Handen (SE); György Miklós, Pilisborosjenö (HU); Kun Wang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 286 days.

(21) Appl. No.: 18/562,906

(22) PCT Filed: Jun. 2, 2022

(86) PCT No.: PCT/SE2022/050539
§ 371 (c)(1),
(2) Date: Nov. 21, 2023

(87) PCT Pub. No.: WO2022/255930
PCT Pub. Date: Dec. 8, 2022

(65) Prior Publication Data
US 2024/0235891 A1 Jul. 11, 2024

Related U.S. Application Data

(60) Provisional application No. 63/196,279, filed on Jun. 3, 2021.

(51) Int. Cl.
*H04L 12/46* (2006.01)
*H04W 40/24* (2009.01)
(Continued)

(52) U.S. Cl.
CPC ........... *H04W 76/11* (2018.02); *H04L 12/462* (2013.01); *H04L 12/4687* (2013.01);
(Continued)

(58) Field of Classification Search
CPC .. H04L 12/46–4695; H04W 8/005–30; H04W 28/02–26; H04W 40/005–38;
(Continued)

(56) References Cited

U.S. PATENT DOCUMENTS

| | | | |
|---|---|---|---|
| 10,951,427 B2 | 3/2021 | Qiao et al. | |
| 2011/0096784 A1 | 4/2011 | Ramalingam | |
| 2011/0149800 A1 | 6/2011 | Ryan et al. | |

FOREIGN PATENT DOCUMENTS

| | | |
|---|---|---|
| CN | 108965159 A | 12/2018 |
| EP | 2859689 A1 | 4/2015 |

(Continued)

OTHER PUBLICATIONS

3GPP , "3rd Generation Partnership Project; Technical Specification Group Services and System Aspects; System architecture for the 5G System (5GS); Stage 2 (Release 17)", 3GPP TS 23.501 V17.0.0, Mar. 2021, 1-489.

*Primary Examiner* — Timothy J Weidner
(74) *Attorney, Agent, or Firm* — Murphy, Bilak & Homiller, PLLC

(57) ABSTRACT

Methods and apparatuses for a 5G System (5GS) (20) support Dynamic VLAN configuration for a logical Ethernet bridge (24) provided by the 5GS. In at least one embodiment, a User Plane Function (UPF) (22) runs, on a conditional basis, for example, Multiple VLAN Registration Protocol (MVRP) for a User Equipment (UE) (12) establishing or modifying an Ethernet Protocol Data Unit (PDU) session. Running MVRP allows the UPF to learn the VLAN's associated with the UE and correspondingly
(Continued)

RECEIVE A VLAN ID (VID) FROM A SMF, FOR A UE ESTABLISHING OR MODIFYING AN ETHERNET PDU SESSION
402

RESPONSIVE TO THE RECEIVED VID BEING A PREDEFINED VID, RUN MVRP FOR THE UE, TO LEARN VIDS OF VLANS ASSOCIATED WITH THE UE, AND PERFORM BRIDGING OPERATIONS FOR ETHERNET TRAFFIC ASSOCIATED WITH THE UE ACCORDING TO THE LEARNED VIDS
404

400 dynamically configure bridging services. In one or more embodiments. UEs that act as trunk ports are assigned a predefined VLAN ID, e.g., via an Application Function (AF) (32), and, for a UE establishing or modifying a session, a Session Management Function (SMF) (26) indicates the predefined VLAN ID to the UPF, triggering the UPF to run MVRP for the UE.

18 Claims, 7 Drawing Sheets

(51) Int. Cl.

| | |
|---|---|
| *H04W 76/11* | (2018.01) |
| *H04W 76/12* | (2018.01) |
| *H04W 80/02* | (2009.01) |
| *H04W 84/02* | (2009.01) |
| *H04W 88/02* | (2009.01) |
| *H04W 88/14* | (2009.01) |
| *H04W 88/18* | (2009.01) |
| *H04W 92/02* | (2009.01) |
| *H04W 92/24* | (2009.01) |

(52) U.S. Cl.
CPC ....... *H04W 40/246* (2013.01); *H04W 40/248* (2013.01); *H04W 76/12* (2018.02); *H04W 80/02* (2013.01); *H04W 84/02* (2013.01); *H04W 88/02* (2013.01); *H04W 88/14* (2013.01); *H04W 88/18* (2013.01); *H04W 92/02* (2013.01); *H04W 92/24* (2013.01)

(58) Field of Classification Search
CPC ... H04W 48/02–20; H04W 60/005–06; H04W 76/10–50; H04W 80/02–12; H04W 84/005–22; H04W 88/005–188; H04W 92/02–24
See application file for complete search history.

(56) References Cited

FOREIGN PATENT DOCUMENTS

| | | |
|---|---|---|
| ES | 2383613 T3 | 6/2012 |
| KR | 20110010481 A | 2/2011 |
| WO | 2020041368 A1 | 2/2020 |

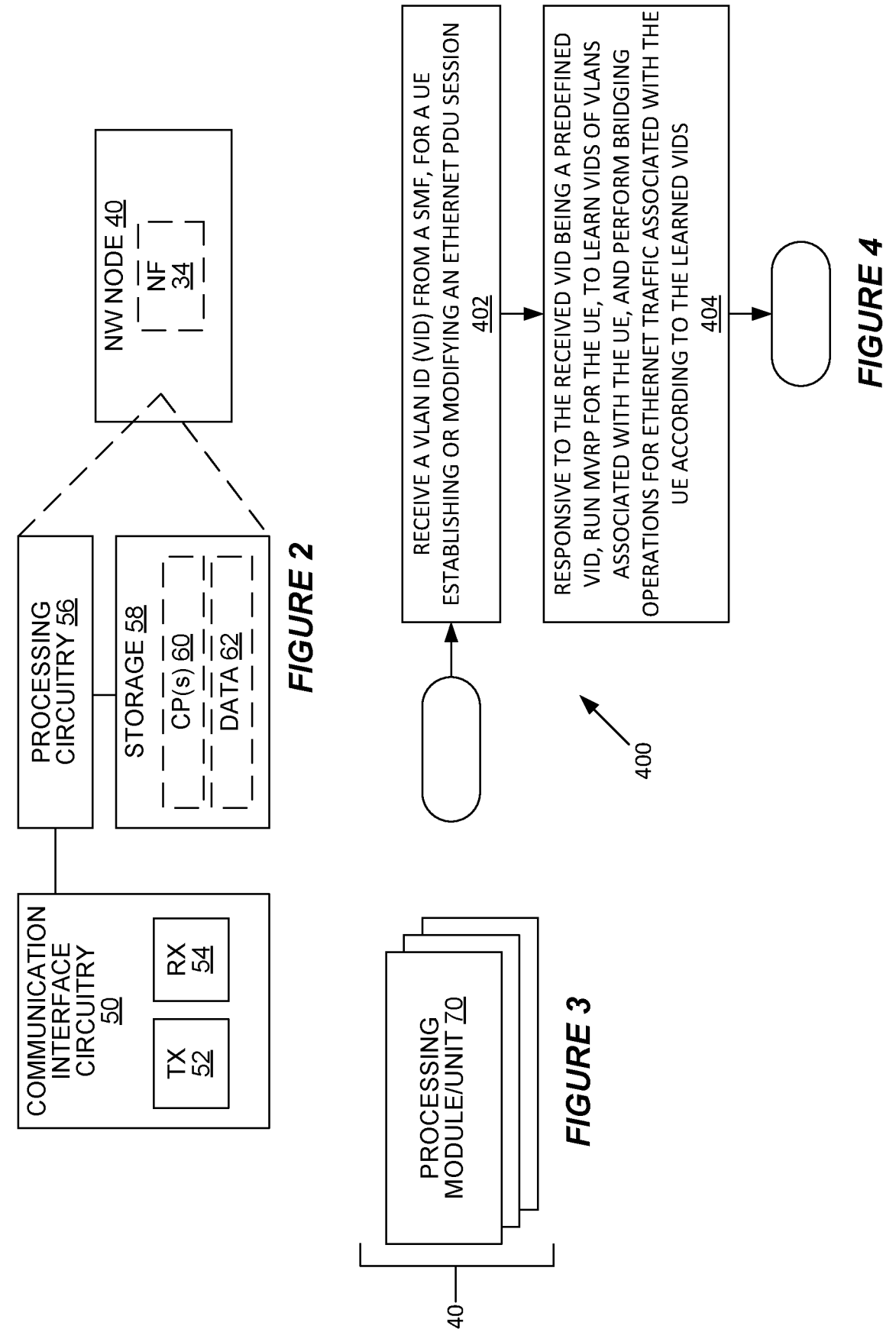

FIGURE 2

NW NODE 40

NF 34

PROCESSING CIRCUITRY 56

STORAGE 58

CP(s) 60

DATA 62

COMMUNICATION INTERFACE CIRCUITRY 50

PROCESSING MODULE/UNIT 70

RECEIVE A VLAN ID (VID) FROM A SMF, FOR A UE ESTABLISHING OR MODIFYING AN ETHERNET PDU SESSION
402

RESPONSIVE TO THE RECEIVED VID BEING A PREDEFINED VID, RUN MVRP FOR THE UE, TO LEARN VIDS OF VLANS ASSOCIATED WITH THE UE, AND PERFORM BRIDGING OPERATIONS FOR ETHERNET TRAFFIC ASSOCIATED WITH THE UE ACCORDING TO THE LEARNED VIDS
404

400

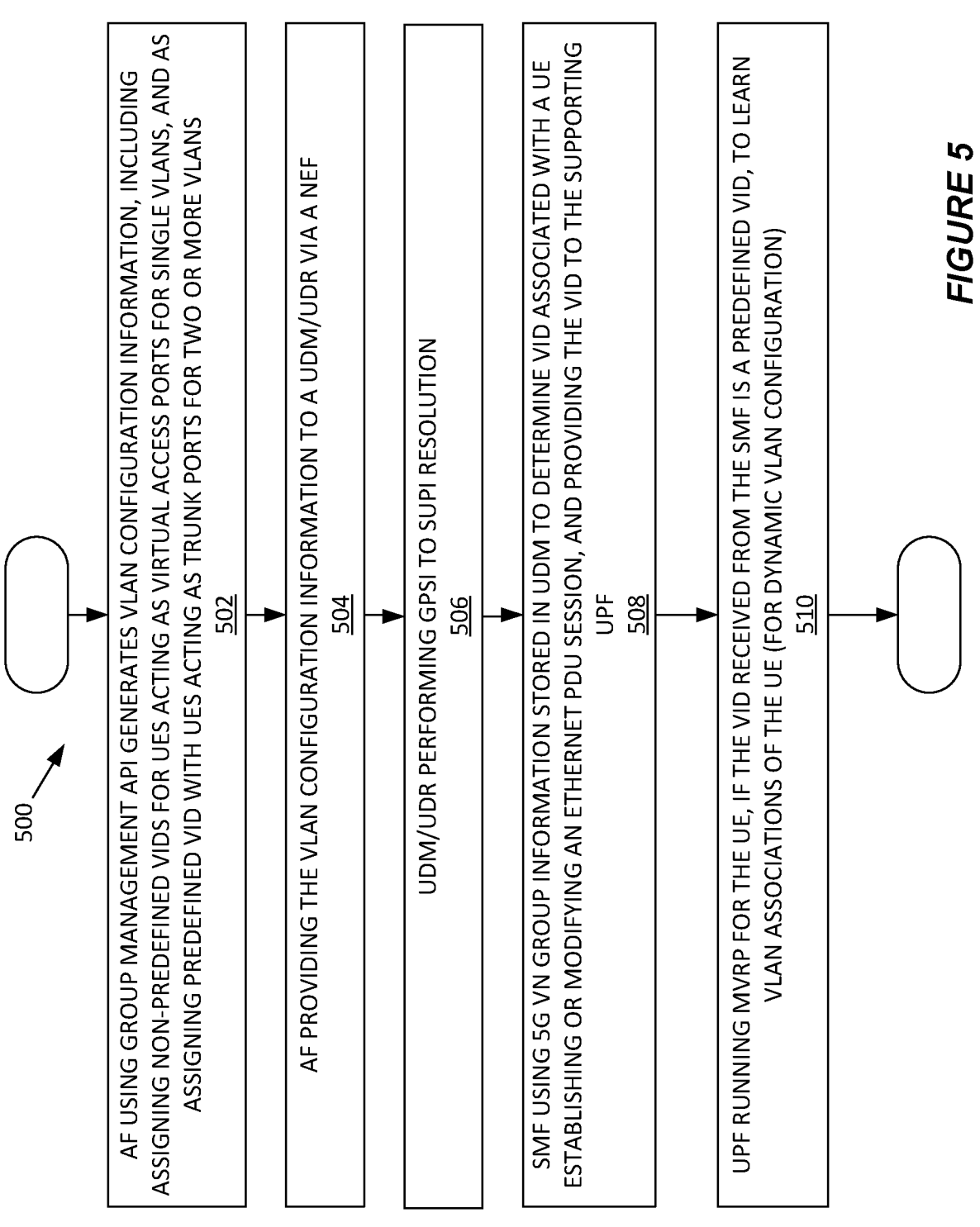

500

AF USING GROUP MANAGEMENT API GENERATES VLAN CONFIGURATION INFORMATION, INCLUDING ASSIGNING NON-PREDEFINED VIDS FOR UES ACTING AS VIRTUAL ACCESS PORTS FOR SINGLE VLANS, AND AS ASSIGNING PREDEFINED VID WITH UES ACTING AS TRUNK PORTS FOR TWO OR MORE VLANS
502

AF PROVIDING THE VLAN CONFIGURATION INFORMATION TO A UDM/UDR VIA A NEF
504

UDM/UDR PERFORMING GPSI TO SUPI RESOLUTION
506

SMF USING 5G VN GROUP INFORMATION STORED IN UDM TO DETERMINE VID ASSOCIATED WITH A UE ESTABLISHING OR MODIFYING AN ETHERNET PDU SESSION, AND PROVIDING THE VID TO THE SUPPORTING UPF
508

UPF RUNNING MVRP FOR THE UE, IF THE VID RECEIVED FROM THE SMF IS A PREDEFINED VID, TO LEARN VLAN ASSOCIATIONS OF THE UE (FOR DYNAMIC VLAN CONFIGURATION)
510

FIGURE 5

HOST QQ400

PROCESSING CIRCUITRY QQ402

INPUT/OUTPUT INTERFACE QQ406

NETWORK INTERFACE QQ408

POWER SOURCE QQ410

BUS QQ404

MEMORY QQ412

HOST APPLICATION PROGRAMS QQ414

DATA QQ416

VIRTUALIZATION ENVIRONMENT QQ500

MANAGEMENT AND ORCHESTRATION QQ510

APPLICATION / VIRTUAL APPLIANCE / VIRTUAL NODE OR SERVER / INSTANCE QQ502

VM QQ508A

VM QQ508B

VIRTUALIZATION LAYER QQ506

HARDWARE QQ504

CONTROL SYSTEM QQ512

METHODS AND APPARATUS SUPPORTING DYNAMIC ETHERNET VLAN CONFIGURATION IN A FIFTH GENERATION SYSTEM

TECHNICAL FIELD

Methods and apparatuses disclosed herein provide for dynamic Virtual Local Area Network (VLAN) configuration in a Fifth Generation System (5GS) providing Ethernet bridging services.

BACKGROUND

Virtual Local Area Network (VLAN) membership can be established either statically or dynamically. Static VLANs are also referred to as port-based VLANs. Static VLAN assignments are created by assigning ports to a VLAN. As a device enters the network, the device automatically assumes the VLAN of the port. If the user changes ports and needs access to the same VLAN, a network administrator must manually make a port-to-VLAN assignment for the new connection.

Dynamic VLANs are created using software or by protocol. With a VLAN Management Policy Server (VMPS), an administrator can assign switch ports to VLANs dynamically based on information such as the source Medium Access Control (MAC) address of the device connected to the port, or the username used to log onto that device. As a device enters the network, the switch queries a database for the VLAN membership of the port to which that device is connected. IEEE 802.1Q defines the Multiple VLAN Registration Protocol (MVRP), which is an application of the Multiple Registration Protocol and allows bridges to negotiate the set of VLANs to be used over a specific link.

A bridge port can be configured in either Access port mode or Trunk port mode for VLAN operation. Access port mode generally is connected to an end-device (e.g., a computer) for access purpose, and a single VLAN is assigned for the access port. Trunk port mode allows ports to transmit and receive data of multiple VLANs; normally, the trunk port mode is used for connection between network devices (bridges, routers).

Specifications promulgated by the Third Generation Partnership Project (3GPP) that define Fifth Generation (5G) telecommunication networks have included some Ethernet support since Release 15. Examples of such support include support for Ethernet Protocol Data Unit (PDU) sessions and MAC learning. Release 16 (Rel 16) and Release 17 (Rel 17) of the 3GPP specifications enhance the support. Rel 16, for example, introduced 5G support for LAN-type services. Rel 16 also specified that a 5G system can be modelled as one or more logical Ethernet bridges, to support integration with Ethernet Time Sensitive Networking (TSN) network. IEEE 802.1Q defines TSN as a standard technology to provide deterministic messaging on standard Ethernet.

There currently exist certain challenge(s). One example challenge is that VLAN configurations for 5G System (5GS) bridges defined by the existing 3GPP specifications cannot be changed using fully centralized configuration signaling. Here, a 5GS acts as one or more logical Ethernet bridges, where the VLAN configuration of the 5GS bridge/es is/are only addressed by 3GPP based on static pre-configuration in a use case where centralized network configuration (CNC) is applied. CNC can be an implementation of Software Defined Networking (SDN) controller.

Clause 5.28.3.3. in the 3GPP Technical Specification (TS) 23.501 v17.0.0, defines how 5GS bridge configuration can be done in connection with CNC, but VLAN configuration cannot be updated using such signaling. Additionally, when it comes to a network deployment, where no CNC is presented in the network (e.g., IEEE 802.1Qcc fully distributed configuration model), there is no 3GPP-defined solution. The performance of VLAN configurations for a 5GS bridge has never been specified, except for the static pre-configuration case.

One problem with static VLAN configurations is that they are not flexible and require manual configuration. Static VLAN configurations are common in wired Ethernet networks. Every port of a bridge is manually configured, and the network administer must manually configure every bridge and every port to make things work. Manual re-configuration is required whenever there is a need for updating or changing VLAN configurations.

In network deployments where no centralized network controller is used (e.g., CNC, SDN controller), current 3GPP specifications do not specify details about how VLAN configurations are to be performed. For example, clause 5.29.4 of 3GPP TS 23.501 v17.0.0 only states that "SMF may instruct the UPF to classify frames based VLAN tags, and to add and remove VLAN tags, on frames received and sent on N6 and N19 . . . ". "SMF" denotes "Session Management Function" and "UPF" denotes "User Plane Function."

Furthermore, the 3GPP specifications have never addressed dynamic VLAN configuration. In a network deployment where centralized network controller is used, clause 5.28.3.3 of 3GPP TS 23.501 v17.0.0 defines how 5GS bridge VLAN configuration can be done in connection with CNC, which is based on static pre-configuration, i.e., the VLAN configuration cannot be changed.

SUMMARY

Certain aspects of the disclosure and their embodiments may provide solutions to the above noted challenges or other challenges. Among other thing, the disclosed techniques include a method for a 5G System (5GS) to support Dynamic VLAN configuration using an Application Function (AF), e.g., a group management Application Program Interface (API).

For ports used in VLAN access port mode, the VLAN configuration can be provisioned through an AF. For ports used in VLAN trunk port mode, a default or predefined VLAN ID can be assigned at beginning, with a User Plane Function (UPF) of the 5GS running IEEE 802.1Q defined Multiple VLAN Registration Protocol (MVRP) for such ports (which may be a UE port, a N6 port, or a N19 port). "Predefined" for example refers to an identifier or identifiers that are known or agreed in advance. The UPF uses the MVRP results to dynamically configure such trunk ports. Here, "N6" refers to the 5G-defined interface between the UPF and a Data Network (DN), and "N19" refers to the interface connecting Protocol Data Unit (PDU) Session Anchor (PSA) UPFs of a single 5G Virtual Network (VN) group.

An example embodiment comprises a method performed by one or more network functions (NFs) of a telecommunication network comprising a 5GS, where the method includes a UPF as one of the one or more NFs, with the UPF providing dynamic VLAN configuration for Ethernet bridging provided by the UPF operating as a 5GS logical bridge. In particular, the method includes the UPF: receiving a VLAN ID (VID) from a Session Management Function (SMF), for a User Equipment (UE) establishing or modifying an Ethernet PDU session; and responsive to the received VID being a predefined VID, running MVRP for the UE, to learn VIDs of VLANs associated with the UE, and performing bridging operations for Ethernet traffic associated with the UE according to the learned VIDs.

In another example embodiment, a 5GS comprises a network node that includes communication interface circuitry and processing circuitry operatively associated with the communication interface circuitry. The processing circuitry is configured to operate the network node as a UPF of the 5GS, with the UPF providing dynamic VLAN configuration for Ethernet bridging provided by the UPF operating as a 5GS logical bridge. The UPF provides the dynamic VLAN configuration services based on being configured to: receive a VID from a SMF, for a UE establishing or modifying an Ethernet PDU session; and responsive to the received VID being a predefined VID, run MVRP for the UE, to learn VIDs of VLANs associated with the UE, and perform bridging operations for Ethernet traffic associated with the UE according to the learned VIDs.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 2 is a block diagram of a network node of a 5GS, according to an example embodiment.

FIG. 3 is a block diagram of example implementation details for a network node of a 5GS, according to one embodiment.

FIG. 4 is a logic flow diagram of a method of operation in a 5GS for providing dynamic VLAN configuration, according to an example embodiment.

FIG. 5 is a logic flow diagram of a method of operation in a 5GS for providing dynamic VLAN configuration, according to further example details.

DETAILED DESCRIPTION

Some of the embodiments contemplated herein will now be described more fully with reference to the accompanying drawings. Embodiments are provided by way of example to convey the scope of the subject matter to those skilled in the art.

To address the existing inability to change the VLAN configuration of a Fifth Generation System (5GS) bridge using fully centralized configuration signaling, one aspect of the solutions proposed herein is a method for VLAN configuration of a 5GS logical bridge in an Ethernet network where there is no centralized network controller (e.g., CNC) in use. To address the existing lack of flexibility and requirements for manual configuration/re-configuration, another aspect of the solutions proposed herein is a method to dynamically configure a VLAN on a 5G bridge. The configuration can be dynamically updated based on the changes in the network.

In an example embodiment, the 5GS bridge ports that are used for access mode are configured directly via an application function (e.g., a group management API). The 5GS bridge ports that are used for trunk mode are dynamically learned and configured by using IEEE 802.1Q defined MVRP. In at least one embodiment, the existing 5G VN group defined in 3GPP are reused for the UE group management purpose, in the context of dynamic VLAN configuration.

Figure 1:
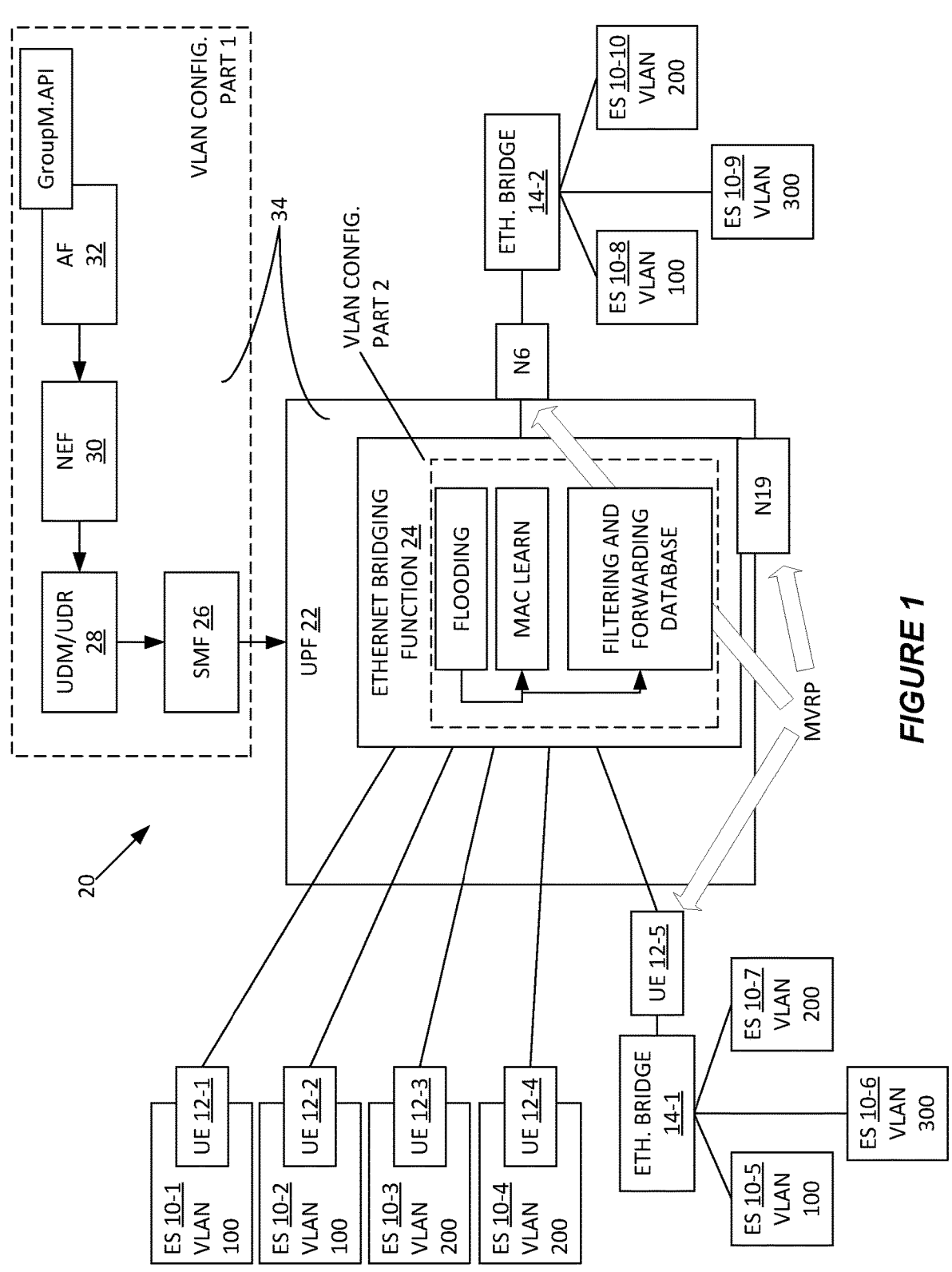
FIG. 1 is a block diagram of a Fifth Generation System (5GS) configured to provide dynamic VLAN configuration services when acting as a logical Ethernet bridge, according to an example embodiment.

Consider an example use case in association with FIG. 1, where there are three Virtual IDs (VIDs) used in the network, representing three different VLANs, denoted as VLAN100, VLAN200, and VLAN300. A number of end stations (ESs) 10 operate in each of the VLANs, where each ES is some form of computing device that supports Ethernet communications. Again, merely as an example for discussion, ES 10-1, ES 10-2, ES 10-5, and ES 10-8 belong to VLAN100, ES 10-3, ES 10-4, ES 10-7, and ES 10-10 belong to VLAN200, and ES 10-6 and 10-9 belong to VLAN300.

ES 10-1 is communicatively connected via a UE 12-1, ES 10-2 is communicatively connected via a UE 12-2, ES 10-3 is communicatively connected via a UE 12-3, ES 10-4 is communicatively connected via a UE 12-4, ESs 10-5, 10-6, and 10-7 are communicatively connected via an Ethernet bridge 14-1, which in turn relies on a UE 12-5 for its communication link, and ESs 10-8, 10-9, and 10-10 are communicatively connected via an Ethernet bridge 14-2, which couples to a 5GS 20 via a N6 interface. ESs 10-1, 10-2, 10-3, and 10-4 coupled to the 5GS 20 via their respective UEs 12, as does the Ethernet bridge 14-1. In this sense, the UEs 12 may be embedded in, integrated with, or otherwise associated with their respective ESs 10, and they provide the radio connectivity for wirelessly connecting to the 5GS 20, with the 5GS 20 advantageously providing bridging services for the Ethernet traffic flowing in the respective VLANs.

While the Radio Access Network (RAN) portion is not shown in FIG. 1, one or more radio access nodes, e.g., gNBs, provide the air interface supporting the wireless connections between the UEs 12 and the 5GS 20, which comprises a telecommunication network operating according to the 5G specifications developed by the 3GPP. With respect to the bridging services and the configuration thereof, Network Functions (NFs) of interest in the 5GS 20 include a User Plane Function (UPF) 22, which includes an Ethernet bridging function 24. Additional NFs include a Session Management Function (SMF) 26, a User Data Management (UDM)/ User Data Repository (UDR) 28, a Network Exposure Function (NEF) 30, and an Application Function (AF) 32. In this example context, the AF 32 provides a VLAN group management Application Programming Interface (API). Any one or more of these NFs may be referred to as NFs 34.

Broadly, VLAN configuration operations and functionality advantageously provided by the 5GS 20 may be considered as having two parts, "VLAN Configuration Part 1" and "VLAN Configuration Part 2". Part 1relates to provisioning of VLAN information, and Part 2 relates to the configuration or setting of VLAN values for a UE or PDU session.

An example VLAN configuration information associated with "Part 1" VLAN configuration operations appears in the below table.

| External GroupID (for VN group creation) | UE GPSI | UE type | VLAN ID |
|---|---|---|---|
| #vid2 default | GPSI#5 | Trunk | #2 a default or pre-defined value |
| #vid100 | GPSI#1 | Access | #100 |
| #vid100 | GPSI#2 | Access | #100 |
| #vid200 | GPSI#3 | Access | #200 |
| #vid200 | GPSI#4 | Access | #200 |

Only ESs 10 that belong to the same VLAN group can communicate with each other. Therefore, a VLAN on a 5GS bridge needs to be properly configured. In FIG. 1, the UPF 22 provides an Ethernet bridging function 24 that performs Ethernet filtering, forwarding, etc. Particularly, all ESs 10 in FIG. 1 that belong to VLAN100 can communicate with each other, based on bridging via the Ethernet bridging function 24, and likewise for the ESs 10 respectively belonging to VLAN200 and VLAN300.

The previously known signaling and specifications for 5GS bridging do not provide for dynamic VLAN configuration. Advantageously, however, the 5GS 20 illustrated in FIG. 1 provides for dynamic VLAN configuration. Of course, the arrangement also supports static VLAN configuration.

With dynamic VLAN configuration, as provided for herein, a number of advantageous use cases become possible. For example, consider "Use Case 1" where the ES 10-1 that incorporates or otherwise uses UE 12-1 for communicating is a robot used in a factory production line with VLAN ID: 100. Subsequently, the robot is moved and repurposed to perform a different task in a different production line. Therefore, the VLAN configuration for the UE 12-1 needs to be changed.

Consider "Use Case 2," where the UE 12-5 provides connectivity for the Ethernet bridge 14-1 that provides Ethernet connections for ESs 10 belonging to multiple VLANs. In the example illustration, the Ethernet bridge 14-1 provides Ethernet connections for ES 10-5, which belongs to the VLAN100, ES 10-6, which belongs to the VLAN300, and ES 10-7, which belongs to the VLAN 200. As such, the UE 12-5 acts as a VLAN trunk port. The same VLAN trunk port operation is true for the N6 and N19 interfaces depicted in FIG. 1. If there are new ESs 10, e.g., a robot and a robot controller (programmable logical controller or "PLC") that belong to a new VLAN group and need to be added in the factory, the corresponding VLAN settings on UE 12-5 and N6 needs to be updated.

According to an example embodiment, a method of dynamically configuring the VLAN setting of an Ethernet bridging function 24 involves an application function (AF) 32 providing, e.g., a group management API. The AF 32 may take input from a VLAN configuration server or network administrator. Based on the involved software applications, the administrator knows, with respect to the 5GS 20, which UEs 12 will be used for access purposes (e.g., act as virtual access port), and which UEs 12 will be used as trunk ports.

For a UE 12 that acts as a virtual access port (vAP), the UE 12 is required to be a member of one VLAN group, and the group management API creates a new group (e.g., with a GroupID) and assigns a VLAN ID (VID). One GroupID maps to one VID. A UE 12 can be added to or removed from a group/VID. These operations are shown in the figure as "VLAN config. part1".

The VLAN ID can be translated into an "External Group ID" which is an identifier for a 5G Virtual Network (VN) group. For a UE 12 used in access port mode, the VID is translated into an "External Group ID". For a UE 12 used in trunk port mode, a predefined "External Group ID" is assigned. The AF can create, update, or delete a 5G VN group using the "External Group ID" and a corresponding set of 5G VN configuration data.

The interface provided by the group management API can also specify to which network the given VLAN applies. The network could be identified by the Data Network Name (DNN). The network may also be a 5G VN, whose members can be identified by the same group management API. That is, the group management API could then be used for defining the members of the group that can connect to the given network, and the members of each VLAN group separately.

As an example, it is possible to define the VLAN group of a given data network using a specific prefix of the DNN. For example, for VLAN ID 100 of factorynetwork.3gpp.org (as the DNN), the approach could use a DNN of vlan100.factorynetwork.3gpp.org.

The 3GPP 5G VN group ID in the existing specifications can be reused for the GroupID purposes. However, in this case, one 5G VN group ID only can be mapped to one VID of a given network. The VID and corresponding 5G VN group ID, along with a list of the members within the 5G VN group, and a list of Generic Public Subscription Identifiers (GPSIs) (each member of a 5G VN group is identified by a GPSI) can be provided by the AF 32 to the UDM/UDR 28 via the NEF 30, along with host 5G VN group data. Then, the involved SMF 26 assigns the UE 12 to that VLAN-associated 5G VN group during Ethernet PDU establishment or modification for that UE 12. The 5GS 20 may include multiple SMFs 26 and the involved SMF 26 is the one that supports the UPF 22 associated with connecting the UE 12 in question to the 5GS 20.

The "VLAN config. part 2" function configures the UE 12 to a corresponding VLAN based on SMF instructions. For UEs 12 that act as virtual trunk ports (e.g., UEs 12 that are connected to a bridge port), or are not members of any VLAN group, a predefined VLAN ID (e.g., VID #2) and a predefined external group ID (used for 5G VN group) can be assigned by AF/Group management API. Optionally, the SMF 26 assigns a predefined VID based on local policy. As an example of local policy, if the SMF 26 sees a UE 12 request an Ethernet PDU session and the UE 12 is not associated with any 5G VN group, the SMF assigns the UE 12 with a predefined VLAN ID (e.g., VID #2)

Broadly, when a UPF 22 of the 5GS 20 receives instructions from a supporting SMF 26 for UEs 12 that are assigned a predefined VLAN (e.g., VID #2), the UPF 22 runs MVRP on those UEs 12. MVRP enables such UEs 12 to dynamically learn different VLANs running on the ports. Then the "VLAN config. part 2" at the UPF 22 can update the VLAN configuration database with the newly learned VLANs for those ports. That is, the UEs 12 with the SMF-instructed predefined VID will be updated dynamically to the multiple VIDs that are leaned from the MVRP process.

The N6, and N19 interfaces normally are used for Ethernet trunk port mode; therefore, their VLAN configuration can be performed in the same way as is done for those UEs 12 that act as virtual trunk ports. However, if a N6 interface is used in access port mode, e.g., N6 connecting to a programmable logical controller that controls a robot at the UE side, then the VLAN configuration of that N6 interface can be configured in the same way as is done for the UEs 12 that act as access ports.

After the VLAN configuration is updated, the traffic forwarding configuration in the 5GS 20 (e.g., in the figure, the forwarding table is in the UPF 22, but can be applied in other nodes as well) needs to be changed according to the new VLAN configurations. For Use Case 1 described above, if UE 12-1 acting as an access port needs to be changed to another VLAN, the changes can be provisioned from the group management AF 32, then through the UDM/UDR 28, and the SMF 26 either performs PDU session modification or releases the old PDU session and re-establishes a new PDU session for the UE 12-1, for updating to the new VLAN.

FIG. 2 depicts a network node ("NW NODE") 40 that implements one or more Network Functions (NFs) in or associated with a 5GS. For example, the network node 40 implements any one or more of a SMF, a UPF, a NEF, a UDM, a UDR, or an AF. As such, any of the nodes/functions in FIG. 1 depicting dynamic VLAN configuration in a 5GS may be implemented according to the example node details depicted in FIG. 2. Of course, the particular NF or functionality implemented by the network node 40 may be determined according to the specifics of the computer program instructions stored in and executed by the processing circuitry of the node.

In more detail, an example network node 40 comprises communication interface circuitry 50, including transmitter circuitry (TX) 52 and receiver circuitry (RX) 54, that is configured to communicatively couple the network node 40 to one or more other nodes in the involved telecommunication network. Such circuitry comprises the physical-medium interface circuitry along with protocol processing—e.g., for implementation of one or more protocols used in or by the telecommunication network for inter-node communications. Non-limiting examples include Ethernet-based interfaces or other data network interfaces. Particulars of the communication interface circuitry depend upon the NF(s) implemented by the network node and the manner in which the network node 40 is implemented, e.g., as a standalone server or as virtualized processing and communication circuitry within a cloud computing center.

The processing circuitry 56 of the depicted network node 40 comprises fixed circuitry or programmatically-configured circuitry or a mix of fixed and programmatically-configured circuitry. Example implementations of the processing circuitry include any one or more of microprocessors, Digital Signal Processors (DSPs), Application Specific Integrated Circuits (ASICs), Field Programmable Gate Arrays (FPGAs), Complex Programmable Logic Devices (CPLDs), or other digital processing circuitry. In at least one embodiment, one or more microprocessors or other digital processors are specially adapted to operate as the depicted processing circuitry, based on executing computer program instructions stored in the network node.

To that end, in one or more embodiments, storage 58 included in the network node 40 comprises one or more types of computer readable media that provide non-transitory storage of computer program instructions in one or more computer programs ("CP(s)") 60. Here, "non-transitory" does not necessarily mean permanent or unchanging but does connote at least some persistence, such as temporary storage of computer program instructions in working memory for program execution by one or more microprocessors or other digital processors. The storage 58, which may store data 62 (provisioned or working), may include a mix of memory or storage circuits or devices, such as volatile memory for runtime operations—program execution—and non-volatile memory or storage for retention of program instructions and/or data, such as provisioning information, VLAN configuration data, subscriber data, etc. Non-limiting examples of storage include any one or more of SRAM, DRAM, FLASH, EEPROM, Solid State Disk (SSD), and magnetic storage.

In one or more embodiments, a network node 40, or at least the NF(s) provided via the network node 40, is implemented as a number of processing modules or units 70, such as shown in FIG. 3. In at least one embodiment, the processing modules/units 70 can be understood as functional or logical elements realized via programmatic configuration of underlying computer circuitry.

In one example, a network node 40 implements an AF, where a VLAN is translated into 5G VN group and corresponding VN configuration data (e.g., DNN for a VN group). In another example, the same or another network node implements a Session Management Function (SMF) that is configured to associate a UE with a 5G VN group. Because the 5G VN group is associated with a VLAN, the SMF can be understood as indirectly associating the UE with the VLAN.

FIG. 4 illustrates a method 400 performed by a UPF 22 of a 5GS 20, as one among a number of NFs 34 comprising the 5GS 20. According to the illustrated example, the method 400 comprises the UPF 22 providing dynamic VLAN configuration for Ethernet bridging provided by the UPF 22 operating as a 5GS logical bridge. Such operation is based on the UPF 22 receiving (Block 402) a VID from a SMF 26, for a UE 12 establishing or modifying an Ethernet PDU session via the 5GS 20. The method 400 further includes, responsive to the received VID being a predefined VID, the UPF 22 running (Block 404) MVRP for the UE 12, to learn VIDs of VLANs associated with the UE 12 and performing bridging operations for Ethernet traffic associated with the UE 12 according to the learned VIDs. Bridging operations operate in the involved Ethernet frames and include VLAN tagging, forwarding, flooding, etc.

For a case where MVRP results indicate that the UE 12 is a trunk port for multiple VLANs having respective VIDs, the method 400 includes the UPF 22 storing the learned VIDs and provides bridging services with respect to the UE 12 only for those Ethernet frames associated with one of the learned VIDs. For example, Ethernet frames not belonging to one of the VLANs associated with the trunk port are dropped.

For a case where MVRP results indicate that the UE 12 is associated with a single VLAN, the method 400 includes the UPF 22 treating the UE 12 as a vAP associated with a single VLAN and providing corresponding bridging services using the learned VID of the single VLAN.

Further, the method 400 includes, responsive to the received VID not being the predefined VID, the UPF 22 treating the UE 12 as a vAP associated with a single VLAN and providing corresponding bridging services using the received VID as the VID of the single LAN.

In one or more embodiments, the SMF 26 comprises one of the one or more NFs 34 of the 5GS 20 that perform one or more steps or operations of the method 400. In at least one such embodiment, the method 400 further comprises the SMF 26 obtaining the VID sent to the UPF 22 from a User Data Management (UDM/User Data Repository (UDR) 28 of the 5GS 20.

In one or more embodiments, the UDM/UDR 28 are ones among the one or more NFs 34 of the 5GS 20 that perform selected steps or operations of the method 400, and in such embodiments the UDM/UDR 28 receives the VID as part of VLAN configuration information generated by an AF 32 and provided to the UDM/UDR 28 by a NEF 30 of the telecommunication network.

In at least one embodiment, the AF 32 comprises one among the one or more NFs 34 of the 5GS 20 that perform one or more steps or operations of the method 400. In at least one such embodiment, the method 400 further comprises the AF 32 using a group management API to generate the VLAN configuration information provided to the UDM/UDR 28, via the NEF 30. The VLAN configuration information defines one or more VLAN groups having respective VIDs, with each VID being translated into an External Group ID serving as an identifier for a 5G VN group, and wherein the method 400 comprises the AF 32:

assigning non-predefined VIDs and External Group IDs for VLAN groups associated with UEs 12 acting as virtual Access Ports (vAPs) for corresponding single VLANs; and assigning predefined VIDs and External Group IDs for VLAN groups associated with UEs 12 acting as trunk ports.

When N6 or N19 interfaces of the UPF 22 act as trunk ports, the method 400 in one or more embodiments further comprises the UPF 22 using MVRP to learn VIDs of VLANs associated with the trunk ports, and store the learned VIDs at the UPF 22, for use in performing bridging operations for the trunk ports. The method 400 may further comprise the UPF 22 maintaining a VLAN table for UEs and N6 and N19 interfaces.

FIG. 5 illustrates a method 500 by a collection of NFs 34 comprised in a 5GS 20, for dynamic VLAN configuration, which can be understood as a collection of operations performed by different NFs 34, according to at least one embodiment of the method 400.

The method 500 comprises an AF 32 using a group management API to generate VLAN configuration information, including (Block 502) the AF 32 assigning non-predefined VIDs for UEs 12 acting as vAPs for single VLANs, and assigning a predefined VID for UEs 12 acting as trunk ports for two or more VLANs. The method 500 further includes the AF 32 providing (Block 504) the VLAN configuration information to a UDM/UDR 28, e.g., based on providing the information via a NEF 30.

Still further, the method 500 includes the UDM/UDR 28 performing (Block 506) GSPI to SUPI resolution (to associate VLAN information with the SUPI(s)), with respect to UEs represented in the VLAN configuration information, and a SMF 26 using (Block 508) 5G VN group information stored in the UDM/UDR 28 as part of the VLAN configuration information, to determine the VID associated with a UE 12 establishing or modifying an Ethernet PDU session via the 5GS 20 and providing the VID to the UPF 22 supporting the session. Correspondingly, the method 500 includes the UPF 22 running (Block 510) MVRP for the UE 12, if the VID indicated by the SMF 26 for the UE 12 is a predefined VID—some predefined certain value or some value within a predefined certain range of values. Running MVRP for the UE 12 results in the UPF 22 learning the VLAN(s) that are associated with the UE 12, meaning that the MVRP results indicate whether the UE 12 is a vAP for a single VLAN or a trunk port for multiple VLANs. The UPF 22 carries out Ethernet bridging operations with respect to the UE 12, according to the learned VID(s) associated with the UE 12.

In the context of the method 500 or, more broadly, the dynamic VLAN configuration techniques disclosed herein, an example 5GS 20 comprises a network node 40 that includes communication interface circuitry 50 and processing circuitry 56 that is operatively associated with the communication interface circuitry 50. The processing circuitry 56 is configured to operate the network node 40 as a UPF 22 of the 5GS 20, with the UPF 22 providing dynamic VLAN configuration for Ethernet bridging provided by the UPF 22 operating as a 5GS logical bridge.

Such operations are based on the UPF 22 being configured to: receive a VID from a SMF 26, for a UE 12 establishing or modifying an Ethernet PDU session via the 5GS 20; and responsive to the received VID being a predefined VID, run MVRP for the UE 12, to learn VIDs of VLANs associated with the UE 12, and perform bridging operations for Ethernet traffic associated with the UE according to the learned VIDs. For a case where MVRP results indicate that the UE 12 is a trunk port for multiple VLANs having respective VIDs, the UPF 22 is configured to store the learned VIDs and provide bridging services with respect to the UE 12 only for those Ethernet frames associated with one of the learned VIDs.

For a case where MVRP results indicate that the UE 12 is associated with a single VLAN, the UPF 22 is configured to treat the UE 12 as a vAP associated with a single VLAN and provide corresponding bridging services using the learned VID of the single VLAN. Further, the UPF 22 is configured to treat the UE 12 as a vAP associated with a single VLAN, in response to the received VID not being the predefined VID and provide corresponding bridging services using the received VID as the VID of the single LAN.

The 5GS 20 in at least one embodiment comprises a further network node 40 that participates in or supports dynamic VLAN configuration, with the further network node 40 comprising processing circuitry configured to operate as the SMF 26, and wherein the SMF 26 is configured to obtain the VID sent to the UPF 22 from a UDM/UDR 28 of the 5GS 20. Here, and elsewhere, it should be understood that there may be multiple network nodes 40 in the 5GS 20 to implement the NFs 34 that participate in or support dynamic VLAN configuration, e.g., a network node 40-1 acting as a UPF 22, a network node 40-2 acting as a SMF 26, and so on.

Further, it should be understood that the processing circuitry 56 of any given network node 40 is configured according to the specified operations/functions performed by that given network node 40. For example, two different network nodes 40 contain or are based on the same or similar microprocessor circuits and supporting memory, but they have substantively different functional configurations, based on executing different sets of computer program instructions.

Thus, in at least one embodiment, each network node 40 that implements one of the various NFs 34 that participate in or support dynamic VLAN configuration includes processing circuitry 56 that is programmatically configured or otherwise specially adapted to carry out specific NF operations, according to the particular computer program instructions executed by the network node 40. As such, in FIG. 2, the NF 34 instantiated or functionally realized via the illustrated network node 40 should be understood as representing any one or more of the NFs 34 described herein in the context of dynamic VLAN configuration, and there may be multiple such network nodes 40 comprised in the 5GS 20.

As such, the 5GS 20 in one or more embodiments includes one or more further network nodes 40 comprising processing circuitry 56 configured to operate as the UDM/UDR 28. The UDM/UDR 28 is configured to receive the VID as part of VLAN configuration information generated by AF 32 and provided to the UDM/UDR 28 by the NEF 30. In at least one embodiment the 5GS 20 comprises a further network node 40 configured to operate as the AF 32, where the AF 32 is configured to use a group management API to generate the VLAN configuration information provided to the UDM/UDR 28, via the NEF 30. The VLAN configuration information defines one or more VLAN groups having respective VIDs, with each VID being translated into an External Group ID serving as an identifier for a 5G VN group. In particular, the AF 32 is configured to: assign non-predefined VIDs and External Group IDs for VLAN groups associated with UEs 12 acting as virtual Access Ports (vAPs) for corresponding single VLANs; and assign predefined VIDs and External Group IDs for VLAN groups associated with UEs 12 acting as trunk ports.

Figure 6:
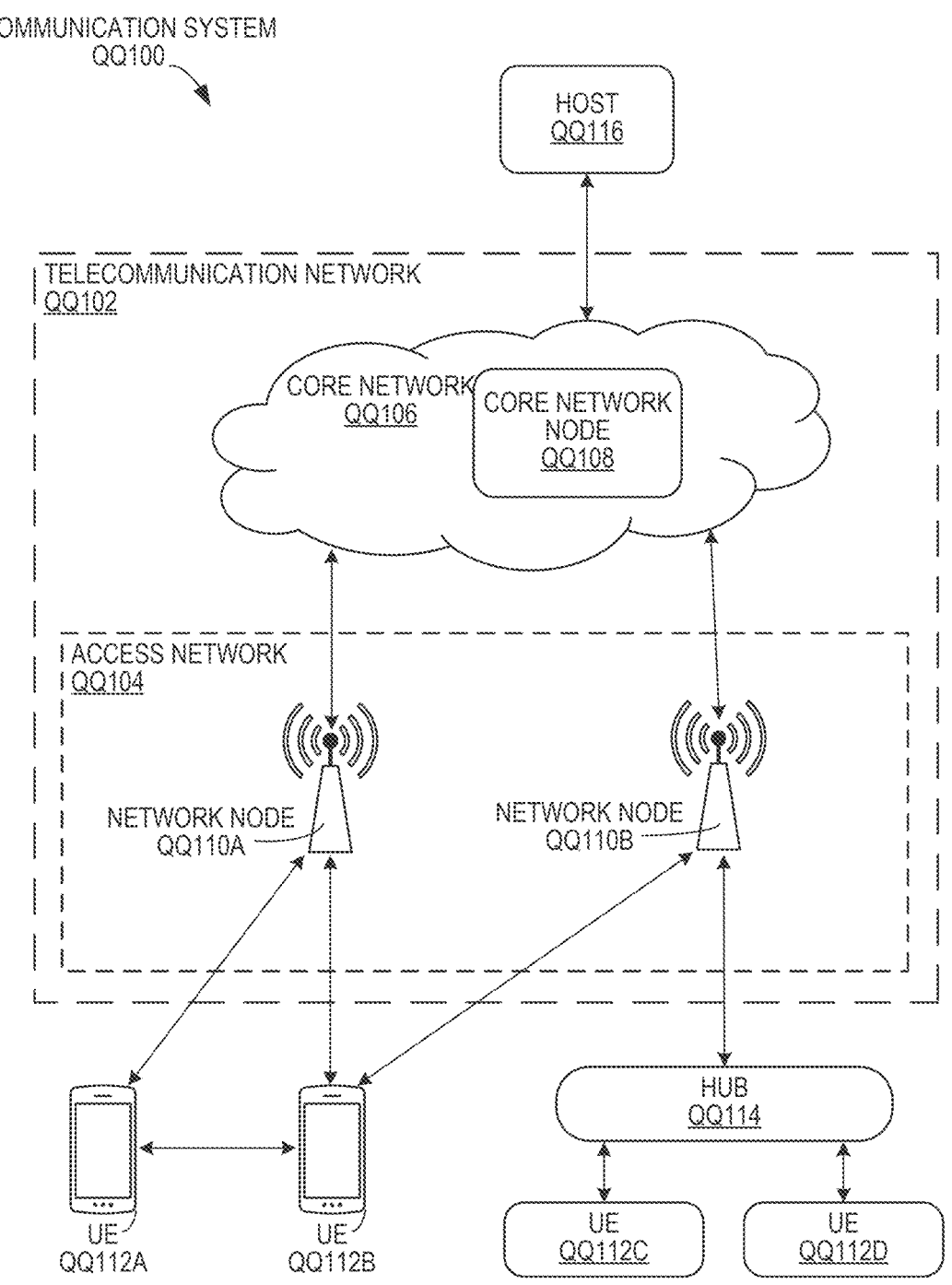
FIG. 6 is a block diagram of a communication system, according to an example embodiment.

FIG. 6 shows an example of a communication system QQ100 in accordance with some embodiments.

In the example, the communication system QQ100 includes a telecommunication network QQ102 that includes an access network QQ104, such as a radio access network (RAN), and a core network QQ106, which includes one or more core network nodes QQ108. The access network QQ104 includes one or more access network nodes, such as network nodes QQ110*a* and QQ110*b* (one or more of which may be generally referred to as network nodes QQ110), or any other similar $3^{rd}$ Generation Partnership Project (3GPP) access node or non-3GPP access point. The network nodes QQ110 facilitate direct or indirect connection of user equipment (UE), such as by connecting UEs QQ112*a*, QQ112*b*, QQ112*c*, and QQ112*d* (one or more of which may be generally referred to as UEs QQ112) to the core network QQ106 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system QQ100 may include any number of wired or wireless networks, network nodes, UEs, and/or any other components or systems that may facilitate or participate in the communication of data and/or signals whether via wired or wireless connections. The communication system QQ100 may include and/or interface with any type of communication, telecommunication, data, cellular, radio network, and/or other similar type of system.

The UEs QQ112 may be any of a wide variety of communication devices, including wireless devices arranged, configured, and/or operable to communicate wirelessly with the network nodes QQ110 and other communication devices. Similarly, the network nodes QQ110 are arranged, capable, configured, and/or operable to communicate directly or indirectly with the UEs QQ112 and/or with other network nodes or equipment in the telecommunication network QQ102 to enable and/or provide network access, such as wireless network access, and/or to perform other functions, such as administration in the telecommunication network QQ102.

In the depicted example, the core network QQ106 connects the network nodes QQ110 to one or more hosts, such as host QQ116. These connections may be direct or indirect via one or more intermediary networks or devices. In other examples, network nodes may be directly coupled to hosts. The core network QQ106 includes one more core network nodes (e.g., core network node QQ108) that are structured with hardware and software components. Features of these components may be substantially similar to those described with respect to the UEs, network nodes, and/or hosts, such that the descriptions thereof are generally applicable to the corresponding components of the core network node QQ108. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host QQ116 may be under the ownership or control of a service provider other than an operator or provider of the access network QQ104 and/or the telecommunication network QQ102 and may be operated by the service provider or on behalf of the service provider. The host QQ116 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system QQ100 of Figure QQ1 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (Wi-Fi); and/or any other appropriate wireless communication standard, such as the Worldwide Interoperability for Microwave Access (WiMAX), Bluetooth, Z-Wave, Near Field Communication (NFC) ZigBee, LiFi, and/or any low-power widearea network (LPWAN) standards such as LoRa and Sigfox.

In some examples, the telecommunication network QQ102 is a cellular network that implements 3GPP standardized features. Accordingly, the telecommunications network QQ102 may support network slicing to provide different logical networks to different devices that are connected to the telecommunication network QQ102. For example, the telecommunications network QQ102 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs QQ112 are configured to transmit and/or receive information without direct human interaction. For instance, a UE may be designed to transmit information to the access network QQ104 on a predetermined schedule, when triggered by an internal or external event, or in response to requests from the access network QQ104. Additionally, a UE may be configured for operating in single- or multi-RAT or multi-standard mode. For example, a UE may operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio-Dual Connectivity (EN-DC).

In the example, the hub QQ114 communicates with the access network QQ104 to facilitate indirect communication between one or more UEs (e.g., UE QQ112c and/or QQ112d) and network nodes (e.g., network node QQ110b). In some examples, the hub QQ114 may be a controller, router, content source and analytics, or any of the other communication devices described herein regarding UEs. For example, the hub QQ114 may be a broadband router enabling access to the core network QQ106 for the UEs. As another example, the hub QQ114 may be a controller that sends commands or instructions to one or more actuators in the UEs. Commands or instructions may be received from the UEs, network nodes QQ110, or by executable code, script, process, or other instructions in the hub QQ114. As another example, the hub QQ114 may be a data collector that acts as temporary storage for UE data and, in some embodiments, may perform analysis or other processing of the data. As another example, the hub QQ114 may be a content source. For example, for a UE that is a VR headset, display, loudspeaker or other media delivery device, the hub QQ114 may retrieve VR assets, video, audio, or other media or data related to sensory information via a network node, which the hub QQ114 then provides to the UE either directly, after performing local processing, and/or after adding additional local content. In still another example, the hub QQ114 acts as a proxy server or orchestrator for the UEs, in particular in if one or more of the UEs are low energy IoT devices.

The hub QQ114 may have a constant/persistent or intermittent connection to the network node QQ110b. The hub QQ114 may also allow for a different communication scheme and/or schedule between the hub QQ114 and UEs (e.g., UE QQ112c and/or QQ112d), and between the hub QQ114 and the core network QQ106. In other examples, the hub QQ114 is connected to the core network QQ106 and/or one or more UEs via a wired connection. Moreover, the hub QQ114 may be configured to connect to an M2M service provider over the access network QQ104 and/or to another UE over a direct connection. In some scenarios, UEs may establish a wireless connection with the network nodes QQ110 while still connected via the hub QQ114 via a wired or wireless connection. In some embodiments, the hub QQ114 may be a dedicated hub—that is, a hub whose primary function is to route communications to/from the UEs from/to the network node QQ110b. In other embodiments, the hub QQ114 may be a non-dedicated hub—that is, a device which is capable of operating to route communications between the UEs and network node QQ110b, but which is additionally capable of operating as a communication start and/or end point for certain data channels.

In one or more embodiments, the telecommunication network QQ102 provides one or more logical bridges for use in VLAN-based communications. For example, one or more network nodes/NFs implemented in the core network QQ106 and/or elsewhere within the network QQ102 implement the dynamic VLAN configuration techniques disclosed herein.

Figure 7:
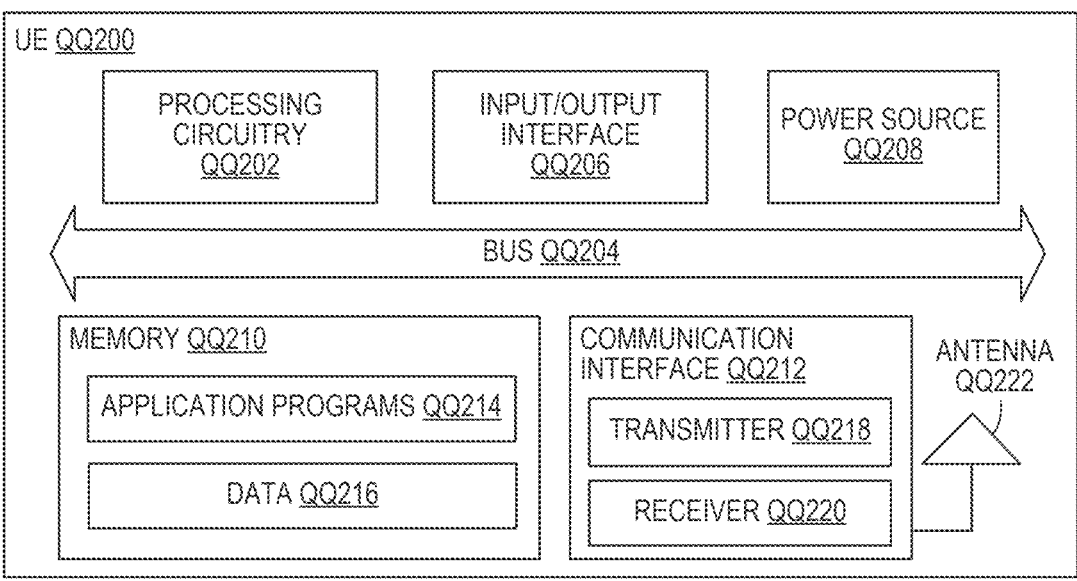
FIG. 7 is a block diagram of a User Equipment (UE), according to an example embodiment.

FIG. 7 shows a UE QQ200 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE QQ200 includes processing circuitry QQ202 that is operatively coupled via a bus QQ204 to an input/output interface QQ206, a power source QQ208, a memory QQ210, a communication interface QQ212, and/or any other component, or any combination thereof. Certain UEs may utilize all or a subset of the components shown in FIG. 7. The level of integration between the components may vary from one UE to another UE. Further, certain UEs may contain multiple instances of a component, such as multiple processors, memories, transceivers, transmitters, receivers, etc.

The processing circuitry QQ202 is configured to process instructions and data and may be configured to implement any sequential state machine operative to execute instructions stored as machine-readable computer programs in the memory QQ210. The processing circuitry QQ202 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry QQ202 may include multiple central processing units (CPUs).

In the example, the input/output interface QQ206 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE QQ200. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source QQ208 is structured as a battery or battery pack. Other types of power sources, such as an external power source (e.g., an electricity outlet), photovoltaic device, or power cell, may be used. The power source QQ208 may further include power circuitry for delivering power from the power source QQ208 itself, and/or an external power source, to the various parts of the UE QQ200 via input circuitry or an interface such as an electrical power cable. Delivering power may be, for example, for charging of the power source QQ208. Power circuitry may perform any formatting, converting, or other modification to the power from the power source QQ208 to make the power suitable for the respective components of the UE QQ200 to which power is supplied.

The memory QQ210 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory QQ210 includes one or more application programs QQ214, such as an operating system, web browser application, a widget, gadget engine, or other application, and corresponding data QQ216. The memory QQ210 may store, for use by the UE QQ200, any of a variety of various operating systems or combinations of operating systems.

The memory QQ210 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory QQ210 may allow the UE QQ200 to access instructions, application programs and the like, stored on transitory or non-transitory memory media, to off-load data, or to upload data. An article of manufacture, such as one utilizing a communication system may be tangibly embodied as or in the memory QQ210, which may be or comprise a device-readable storage medium.

The processing circuitry QQ202 may be configured to communicate with an access network or other network using the communication interface QQ212. The communication interface QQ212 may comprise one or more communication subsystems and may include or be communicatively coupled to an antenna QQ222. The communication interface QQ212 may include one or more transceivers used to communicate, such as by communicating with one or more remote transceivers of another device capable of wireless communication (e.g., another UE or a network node in an access network). Each transceiver may include a transmitter QQ218 and/or a receiver QQ220 appropriate to provide network communications (e.g., optical, electrical, frequency allocations, and so forth). Moreover, the transmitter QQ218 and receiver QQ220 may be coupled to one or more antennas (e.g., antenna QQ222) and may share circuit components, software or firmware, or alternatively be implemented separately.

In the illustrated embodiment, communication functions of the communication interface QQ212 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMAX, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface QQ212, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE QQ200 shown in FIG. 7.

As yet another specific example, in an IoT scenario, a UE may represent a machine or other device that performs monitoring and/or measurements and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 8:
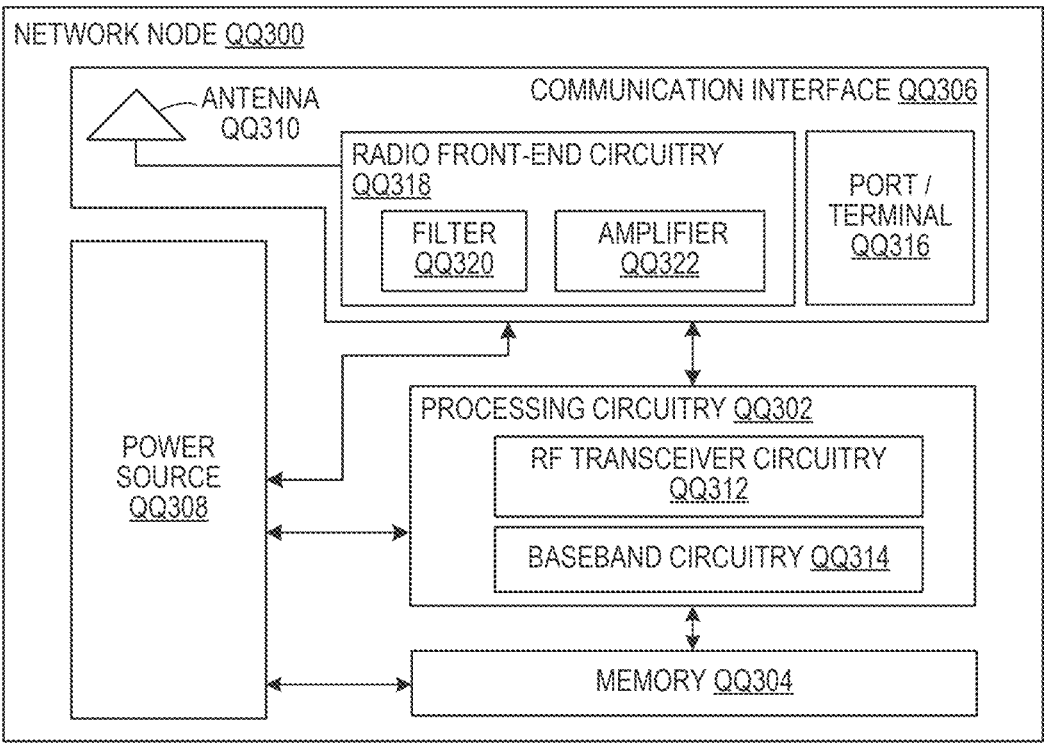
FIG. 8 is a block diagram of a network node, according to an example embodiment.

FIG. 8 shows a network node QQ300 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node QQ300 includes a processing circuitry QQ302, a memory QQ304, a communication interface QQ306, and a power source QQ308. The network node QQ300 may be composed of multiple physically separate components (e.g., a NodeB component and a RNC component, or a BTS component and a BSC component, etc.), which may each have their own respective components. In certain scenarios in which the network node QQ300 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node QQ300 may be configured to support multiple radio access technologies (RATs). In such embodiments, some components may be duplicated (e.g., separate memory QQ304 for different RATs) and some components may be reused (e.g., a same antenna QQ310 may be shared by different RATs). The network node QQ300 may also include multiple sets of the various illustrated components for different wireless technologies integrated into network node QQ300, for example GSM, WCDMA, LTE, NR, Wi-Fi, Zigbee, Z-wave, LoRaWAN, Radio Frequency Identification (RFID) or Bluetooth wireless technologies. These wireless technologies may be integrated into the same or different chip or set of chips and other components within network node QQ300.

The processing circuitry QQ302 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ300 components, such as the memory QQ304, to provide network node QQ300 functionality.

In some embodiments, the processing circuitry QQ302 includes a system on a chip (SOC). In some embodiments, the processing circuitry QQ302 includes one or more of radio frequency (RF) transceiver circuitry QQ312 and baseband processing circuitry QQ314. In some embodiments, the radio frequency (RF) transceiver circuitry QQ312 and the baseband processing circuitry QQ314 may be on separate chips (or sets of chips), boards, or units, such as radio units and digital units. In alternative embodiments, part or all of RF transceiver circuitry QQ312 and baseband processing circuitry QQ314 may be on the same chip or set of chips, boards, or units.

The memory QQ304 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry QQ302. The memory QQ304 may store any suitable instructions, data, or information, including a computer program, software, an application including one or more of logic, rules, code, tables, and/or other instructions capable of being executed by the processing circuitry QQ302 and utilized by the network node QQ300. The memory QQ304 may be used to store any calculations made by the processing circuitry QQ302 and/or any data received via the communication interface QQ306. In some embodiments, the processing circuitry QQ302 and memory QQ304 is integrated.

The communication interface QQ306 is used in wired or wireless communication of signaling and/or data between a network node, access network, and/or UE. As illustrated, the communication interface QQ306 comprises port(s)/terminal (s) QQ316 to send and receive data, for example to and from a network over a wired connection. The communication interface QQ306 also includes radio front-end circuitry QQ318 that may be coupled to, or in certain embodiments a part of, the antenna QQ310. Radio front-end circuitry QQ318 comprises filters QQ320 and amplifiers QQ322. The radio front-end circuitry QQ318 may be connected to an antenna QQ310 and processing circuitry QQ302. The radio front-end circuitry may be configured to condition signals communicated between antenna QQ310 and processing circuitry QQ302. The radio front-end circuitry QQ318 may receive digital data that is to be sent out to other network nodes or UEs via a wireless connection. The radio front-end circuitry QQ318 may convert the digital data into a radio signal having the appropriate channel and bandwidth parameters using a combination of filters QQ320 and/or amplifiers QQ322. The radio signal may then be transmitted via the antenna QQ310. Similarly, when receiving data, the antenna QQ310 may collect radio signals which are then converted into digital data by the radio front-end circuitry QQ318. The digital data may be passed to the processing circuitry QQ302. In other embodiments, the communication interface may comprise different components and/or different combinations of components.

In certain alternative embodiments, the network node QQ300 does not include separate radio front-end circuitry QQ318, instead, the processing circuitry QQ302 includes radio front-end circuitry and is connected to the antenna QQ310. Similarly, in some embodiments, all or some of the RF transceiver circuitry QQ312 is part of the communication interface QQ306. In still other embodiments, the communication interface QQ306 includes one or more ports or terminals QQ316, the radio front-end circuitry QQ318, and the RF transceiver circuitry QQ312, as part of a radio unit (not shown), and the communication interface QQ306 communicates with the baseband processing circuitry QQ314, which is part of a digital unit (not shown).

The antenna QQ310 may include one or more antennas, or antenna arrays, configured to send and/or receive wireless signals. The antenna QQ310 may be coupled to the radio front-end circuitry QQ318 and may be any type of antenna capable of transmitting and receiving data and/or signals wirelessly. In certain embodiments, the antenna QQ310 is separate from the network node QQ300 and connectable to the network node QQ300 through an interface or port.

The antenna QQ310, communication interface QQ306, and/or the processing circuitry QQ302 may be configured to perform any receiving operations and/or certain obtaining operations described herein as being performed by the network node. Any information, data and/or signals may be received from a UE, another network node and/or any other network equipment. Similarly, the antenna QQ310, the communication interface QQ306, and/or the processing circuitry QQ302 may be configured to perform any transmitting operations described herein as being performed by the network node. Any information, data and/or signals may be transmitted to a UE, another network node and/or any other network equipment.

The power source QQ308 provides power to the various components of network node QQ300 in a form suitable for the respective components (e.g., at a voltage and current level needed for each respective component). The power source QQ308 may further comprise, or be coupled to, power management circuitry to supply the components of the network node QQ300 with power for performing the functionality described herein. For example, the network node QQ300 may be connectable to an external power source (e.g., the power grid, an electricity outlet) via an input circuitry or interface such as an electrical cable, whereby the external power source supplies power to power circuitry of the power source QQ308. As a further example, the power source QQ308 may comprise a source of power in the form of a battery or battery pack which is connected to, or integrated in, power circuitry. The battery may provide backup power should the external power source fail.

Embodiments of the network node QQ300 may include additional components beyond those shown in FIG. 8 for providing certain aspects of the network node's functionality, including any of the functionality described herein and/or any functionality necessary to support the subject matter described herein. For example, the network node QQ300 may include user interface equipment to allow input of information into the network node QQ300 and to allow output of information from the network node QQ300. This may allow a user to perform diagnostic, maintenance, repair, and other administrative functions for the network node QQ300.

Figures 9, 10:
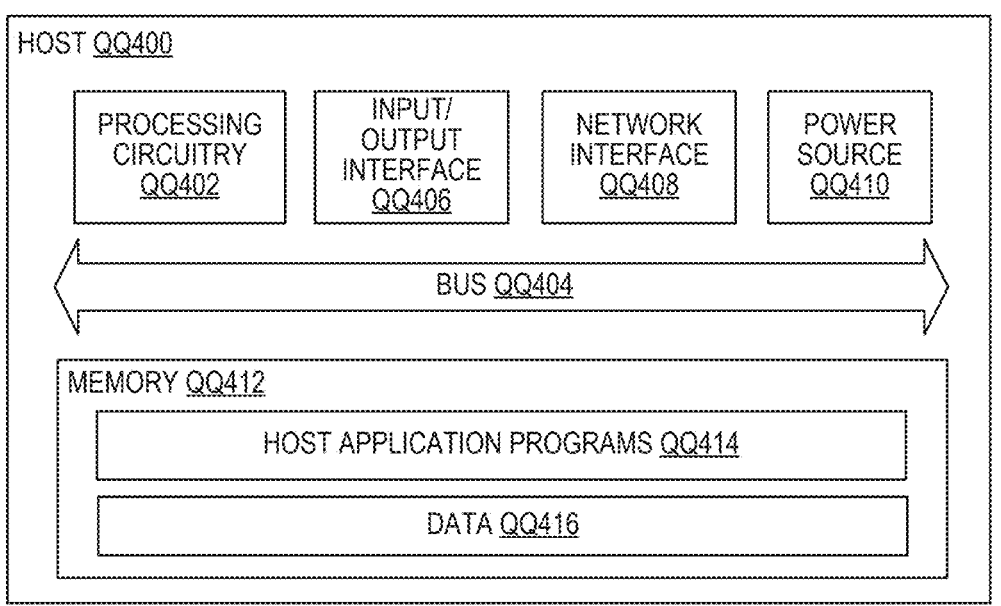
FIG. 9 is a block diagram of a host, according to an example embodiment.
FIG. 10 is a block diagram of a virtualization environment, according to an example embodiment.

FIG. 9 is a block diagram of a host QQ400, which may be an embodiment of the host QQ116 of FIG. 6, in accordance with various aspects described herein. As used herein, the host QQ400 may be or comprise various combinations hardware and/or software, including a standalone server, a blade server, a cloud-implemented server, a distributed server, a virtual machine, container, or processing resources in a server farm. The host QQ400 may provide one or more services to one or more UEs.

The host QQ400 includes processing circuitry QQ402 that is operatively coupled via a bus QQ404 to an input/output interface QQ406, a network interface QQ408, a power source QQ410, and a memory QQ412. Other components may be included in other embodiments. Features of these components may be substantially similar to those described with respect to the devices of previous figures, such as FIGS. 7 and 8, such that the descriptions thereof are generally applicable to the corresponding components of host QQ400.

The memory QQ412 may include one or more computer programs including one or more host application programs QQ414 and data QQ416, which may include user data, e.g., data generated by a UE for the host QQ400, or data generated by the host QQ400 for a UE. Embodiments of the host QQ400 may utilize only a subset, or all of the components shown. The host application programs QQ414 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs QQ414 may also provide for user authentication and licensing checks and may periodically report health, routes, and content availability to a central node, such as a device in or on the edge of a core network. Accordingly, the host QQ400 may select and/or indicate a different host for over-the-top services for a UE. The host application programs QQ414 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

FIG. 10 is a block diagram illustrating a virtualization environment QQ500 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments QQ500 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications QQ502 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware QQ504 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers QQ506 (also referred to as hypervisors or virtual machine monitors (VMMs)), provide VMs QQ508a and QQ508b (one or more of which may be generally referred to as VMs QQ508), and/or perform any of the functions, features and/or benefits described in relation with some embodiments described herein. The virtualization layer QQ506 may present a virtual operating platform that appears like networking hardware to the VMs QQ508.

The VMs QQ508 comprise virtual processing, virtual memory, virtual networking or interface and virtual storage, and may be run by a corresponding virtualization layer QQ506. Different embodiments of the instance of a virtual appliance QQ502 may be implemented on one or more of VMs QQ508, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM QQ508 may be a software implementation of a physical machine that runs programs as if they were executing on a physical, non-virtualized machine. Each of the VMs QQ508, and that part of hardware QQ504 that executes that VM, be it hardware dedicated to that VM and/or hardware shared by that VM with others of the VMs, forms separate virtual network elements. Still in the context of NFV, a virtual network function is responsible for handling specific network functions that run in one or more VMs QQ508 on top of the hardware QQ504 and corresponds to the application QQ502.

Hardware QQ504 may be implemented in a standalone network node with generic or specific components. Hardware QQ504 may implement some functions via virtualization. Alternatively, hardware QQ504 may be part of a larger cluster of hardware (e.g., such as in a data center or CPE) where many hardware nodes work together and are managed via management and orchestration QQ510, which, among others, oversees lifecycle management of applications QQ502. In some embodiments, hardware QQ504 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system QQ512 which may alternatively be used for communication between hardware nodes and radio units.

Figure 11:
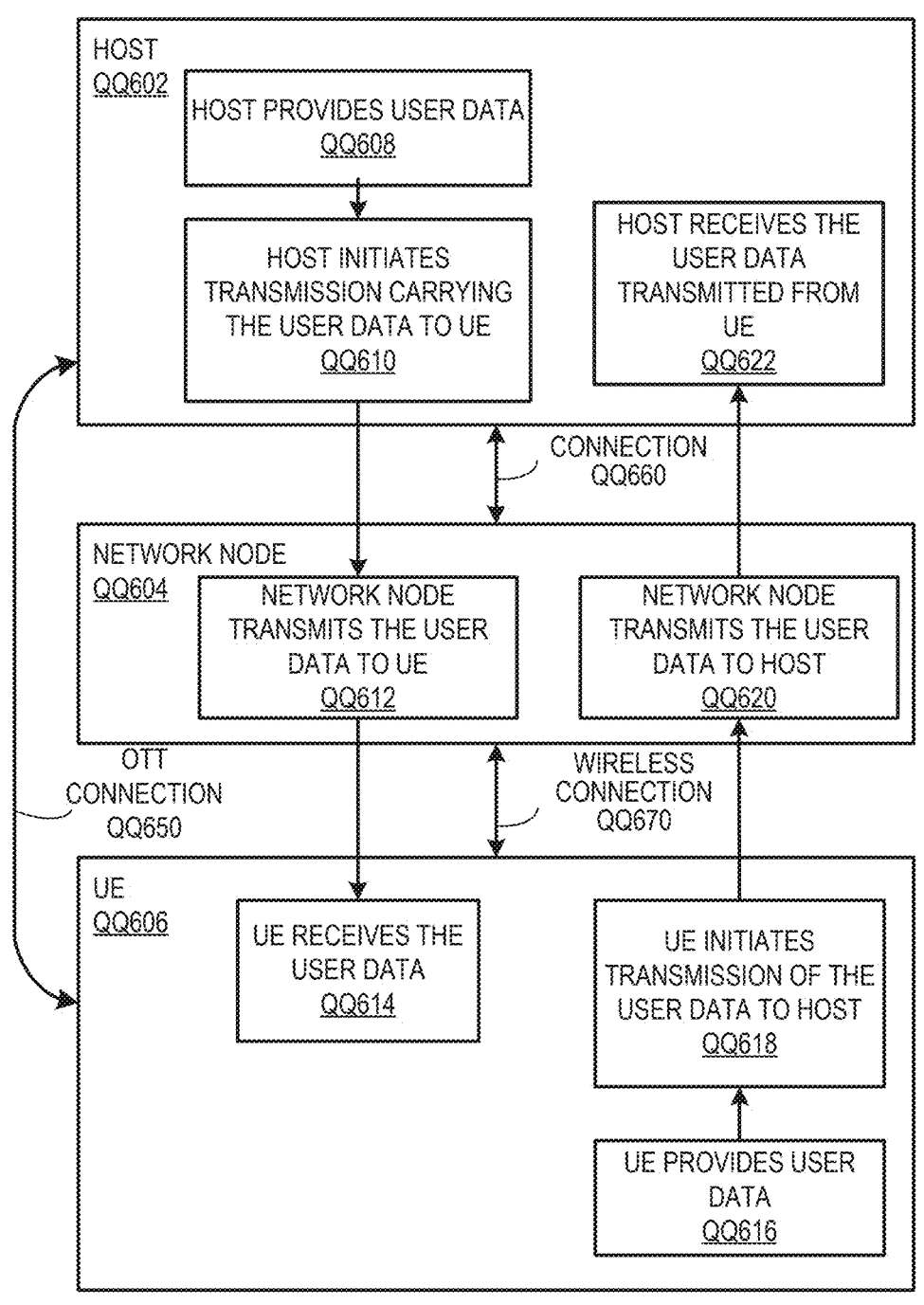
FIG. 11 is a block diagram of a host, a network node, and a UE, and communications therebetween, according to an example embodiment.

FIG. 11 shows a communication diagram of a host QQ602 communicating via a network node QQ604 with a UE QQ606 over a partially wireless connection in accordance with some embodiments. Example implementations, in accordance with various embodiments, of the UE (such as a UE QQ112a of FIG. 6 and/or UE QQ200 of FIG. 7), network node (such as network node QQ110a of FIG. 6 and/or network node QQ300 of FIG. 8), and host (such as host QQ116 of FIG. 6 and/or host QQ400 of FIG. 9) discussed in the preceding paragraphs will now be described with reference to FIG. 11.

Like host QQ400, embodiments of host QQ602 include hardware, such as a communication interface, processing circuitry, and memory. The host QQ602 also includes software, which is stored in or accessible by the host QQ602 and executable by the processing circuitry. The software includes a host application that may be operable to provide a service to a remote user, such as the UE QQ606 connecting via an over-the-top (OTT) connection QQ650 extending between the UE QQ606 and host QQ602. In providing the service to the remote user, a host application may provide user data which is transmitted using the OTT connection QQ650.

The network node QQ604 includes hardware enabling it to communicate with the host QQ602 and UE QQ606. The connection QQ660 may be direct or pass through a core network (like core network QQ106 of FIG. 6) and/or one or more other intermediate networks, such as one or more public, private, or hosted networks. For example, an intermediate network may be a backbone network or the Internet.

The UE QQ606 includes hardware and software, which is stored in or accessible by UE QQ606 and executable by the UE's processing circuitry. The software includes a client application, such as a web browser or operator-specific "app" that may be operable to provide a service to a human or non-human user via UE QQ606 with the support of the host QQ602. In the host QQ602, an executing host application may communicate with the executing client application via the OTT connection QQ650 terminating at the UE QQ606 and host QQ602. In providing the service to the user, the UE's client application may receive request data from the host's host application and provide user data in response to the request data. The OTT connection QQ650 may transfer both the request data and the user data. The UE's client application may interact with the user to generate the user data that it provides to the host application through the OTT connection QQ650.

The OTT connection QQ650 may extend via a connection QQ660 between the host QQ602 and the network node QQ604 and via a wireless connection QQ670 between the network node QQ604 and the UE QQ606 to provide the connection between the host QQ602 and the UE QQ606. The connection QQ660 and wireless connection QQ670, over which the OTT connection QQ650 may be provided, have been drawn abstractly to illustrate the communication between the host QQ602 and the UE QQ606 via the network node QQ604, without explicit reference to any intermediary devices and the precise routing of messages via these devices.

As an example of transmitting data via the OTT connection QQ650, in step QQ608, the host QQ602 provides user data, which may be performed by executing a host application. In some embodiments, the user data is associated with a particular human user interacting with the UE QQ606. In other embodiments, the user data is associated with a UE QQ606 that shares data with the host QQ602 without explicit human interaction. In step QQ610, the host QQ602 initiates a transmission carrying the user data towards the UE QQ606. The host QQ602 may initiate the transmission responsive to a request transmitted by the UE QQ606. The request may be caused by human interaction with the UE QQ606 or by operation of the client application executing on the UE QQ606. The transmission may pass via the network node QQ604, in accordance with the teachings of the embodiments described throughout this disclosure. Accordingly, in step QQ612, the network node QQ604 transmits to the UE QQ606 the user data that was carried in the transmission that the host QQ602 initiated, in accordance with the teachings of the embodiments described throughout this disclosure. In step QQ614, the UE QQ606 receives the user data carried in the transmission, which may be performed by a client application executed on the UE QQ606 associated with the host application executed by the host QQ602.

In some examples, the UE QQ606 executes a client application which provides user data to the host QQ602. The user data may be provided in reaction or response to the data received from the host QQ602. Accordingly, in step QQ616, the UE QQ606 may provide user data, which may be performed by executing the client application. In providing the user data, the client application may further consider user input received from the user via an input/output interface of the UE QQ606. Regardless of the specific manner in which the user data was provided, the UE QQ606 initiates, in step QQ618, transmission of the user data towards the host QQ602 via the network node QQ604. In step QQ620, in accordance with the teachings of the embodiments described throughout this disclosure, the network node QQ604 receives user data from the UE QQ606 and initiates transmission of the received user data towards the host QQ602. In step QQ622, the host QQ602 receives the user data carried in the transmission initiated by the UE QQ606.

One or more of the various embodiments improve the performance of OTT services provided to the UE QQ606 using the OTT connection QQ650, in which the wireless connection QQ670 forms the last segment. More precisely, the teachings of these embodiments may improve VLAN operations for RAN-based VLANs and thereby provide benefits such as dynamic VLAN configuration in 5GS.

In an example scenario, factory status information may be collected and analyzed by the host QQ602. As another example, the host QQ602 may process audio and video data which may have been retrieved from a UE for use in creating maps. As another example, the host QQ602 may collect and analyze real-time data to assist in controlling vehicle congestion (e.g., controlling traffic lights). As another example, the host QQ602 may store surveillance video uploaded by a UE. As another example, the host QQ602 may store or control access to media content such as video, audio, VR or AR which it can broadcast, multicast or unicast to UEs. As other examples, the host QQ602 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection QQ650 between the host QQ602 and UE QQ606, in response to variations in the measurement results. The measurement procedure and/or the network functionality for reconfiguring the OTT connection may be implemented in software and hardware of the host QQ602 and/or UE QQ606. In some embodiments, sensors (not shown) may be deployed in or in association with other devices through which the OTT connection QQ650 passes; the sensors may participate in the measurement procedure by supplying values of the monitored quantities exemplified above or supplying values of other physical quantities from which software may compute or estimate the monitored quantities. The reconfiguring of the OTT connection QQ650 may include message format, retransmission settings, preferred routing etc.; the reconfiguring need not directly alter the operation of the network node QQ604. Such procedures and functionalities may be known and practiced in the art. In certain embodiments, measurements may involve proprietary UE signaling that facilitates measurements of throughput, propagation times, latency and the like, by the host QQ602. The measurements may be implemented in that software causes messages to be transmitted, in particular empty or 'dummy' messages, using the OTT connection QQ650 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions, and methods disclosed herein. Determining, calculating, obtaining or similar operations described herein may be performed by processing circuitry, which may process information by, for example, converting the obtained information into other information, comparing the obtained information, or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device but are enjoyed by the computing device as a whole, and/or by end users and a wireless network generally.

With the above examples in mind, embodiments disclosed herein include but are not limited to the following:

Group A Embodiments

1. A method for VLAN configuration of a 5GS logical bridge in an Ethernet network where there is no centralized network controller in use.

2. A method to dynamically configure a VLAN on a 5GS logical bridge, wherein the configuration is dynamically updated based on network changes.

3. The method of embodiment 2, wherein the bridge ports of the 5GS logical bridge that are used for access mode are configured directly via an Application Function.

4. The method of embodiment 3, wherein the Application Function uses a group management API exposed via a Network Exposure Function (NEF) of the 5GS.

5. The method of embodiment 2, wherein the bridge ports of the 5GS logical bridge that are used for trunk mode are learned dynamically and configured by using Multiple VLAN Registration Protocol (MVRP) as defined by IEEE 802.1Q.

6. A method of reusing 5G Virtual Network (VN) groups for UE group management purposes, in the context of dynamic VLAN configuration with respect to a 5GS logical bridge.

7. The method of any of the previous embodiments, further comprising:
   obtaining user data; and
   forwarding the user data to a host or a user equipment.

8. The method of embodiment 7, wherein forwarding the user data to the host or the user equipment comprises forwarding the data via a logical bridge in a telecommunication network operating according to dynamically-configured VLAN information.

9. A method performed by one or more network functions (NFs) of a telecommunication network, the method comprising:

an Application Function (AF) using a group management API to configure VLAN information in a Unified Data Management (UDM)/User Data Repository (UDR), via a Network Exposure Function (NEF), the VLAN information defining one or more VLAN groups having respective VLAN IDs and associating UEs that act as virtual Access Ports (vAPs) to respective VLAN groups; the VLAN ID is translated into an "External Group ID" which is a identifier for a 5G VN group; for a UE used in access port mode, a VLAN ID is translated into an "External Group ID", or the VLAN ID is used directly as the "External Group ID"; for a UE used in trunk port mode, a predefined VLAN ID and a predefined "External Group ID" are assigned; the AF creates/updates/deletes a 5G VN group using the "External Group ID" and a set of 5G VN configuration data;

a Unified Data Management (UDM) resolving the GPSI to SUPI, and requesting to create, update or delete the provisioned parameters as part of the subscriber data; if a new 5G VN group is created, the UDM assigns an internal Group ID for the 5G VN group; the UDM classifies the received parameters into AMF-associated and SMF-associated parameters; the UDM stores the SMF-associated parameters under corresponding Session Management Subscription data type; the UDM performs Nudm_SDM_Notification (SUPI or Internal Group Identifier, SMF-Associated parameter set, DNN/S-NSSAI, etc.) service operation;

a User Data Repository (UDR) storing the provisioned 5G VN group data as part of UE and/or group subscription data;

a Session Management Function (SMF), based on UDM 5G VN group information, deriving a corresponding VLAN ID for a 5G VN group, where the SMF indicates the VLAN ID to the UPF (e.g., in "Ethernet PDU session information" of N4/Packet Forwarding Control Protocol session); the SMF further indicating a predefined VLAN ID to the UPF, for UEs that are not associated with any of defined VLAN groups; and the UPF implementing a logical bridge supporting VLAN-based communications, based on the VLAN ID information received from SMF; wherein, if a VLAN ID indicated from SMF for a UE is a predefined VLAN (e.g. VLAN #2), the VLAN configuration function at the UPF uses Multiple VLAN Registration Protocol (MVRP) operations to learn VLAN associations for the UEs indicated as having predefined VLAN IDs; after the MVRP operations are completed, a list of learned VLANs that are associated with the UEs is updated and stored in the VLAN configuration function at the UPF for VLAN bridging operations, e.g., VLAN filtering, traffic forwarding, flooding; for example, with respect to incoming Ethernet frames at the UE trunk port, only those tagged VLAN frames that are on the list are served, others are dropped; and wherein, if a VLAN ID indicated from the SMF for a UE is not the predefined VLAN ID, the VLAN configuration function at the UPF recognizes that the UE is a VLAN access port, therefore performs VLAN operations, such as tagging Ethernet frames with the indicated VLAN ID.

10. The method of embodiment 9, wherein UEs that act as virtual trunk ports are initially assigned the predefined VLAN ID and a predefined 5G VN group.

11. The method of embodiment 9, wherein when N6 or N19 interfaces act as trunk ports, the VLAN configuration function at the UPF uses MVRP operations to learn VLANs;

after the MVRP operations are completed, a list of learned VLANs that are associated with the N6 or N19 interfaces is updated and stored in the VLAN configuration function at the UPF, for use in performing VLAN bridging operations, e.g., VLAN filtering, traffic forwarding, flooding.

12. The method of embodiment 9, wherein, if a N6 interface operates in VLAN access port mode, the method of embodiment 9 for access port configuration applies.

13. The method of embodiment 9, wherein the VLAN configuration function at the UPF maintains a VLAN table for UEs, and N6 and N19 interfaces.

14. A method of operation by a network node of a 5GS, the method comprising, with respect to a User Equipment (UE) that is establishing or modifying a PDU session, running MVRP for the UE to learn the VLANs associated with the UE and providing Ethernet bridging services for the UE in dependence on the learned VLAN associations.

15. The method of embodiment 14, wherein running MVRP for the UE is a conditional operation, triggered in response to determining that the UE is associated with a predefined VLAN ID.

16. A network node comprising:
processing circuitry configured to perform any of the steps of any of the Group A embodiments;
power supply circuitry configured to supply power to the processing circuitry.

17. A network node comprising:
communication interface circuitry configured to communicatively couple the network node to one or more other network nodes; and
processing circuitry operatively associated with the communication interface circuitry and configured to perform any of the steps of any of the Group A embodiments.

18. The network node of embodiment 16 wherein the network node operates as one or more Network Functions (NFs) in a 5G telecommunication network, for supporting dynamic VLAN configuration of a 5G logical bridge implemented in the 5G telecommunication network.

19. The network node of embodiment 18, wherein the one or more NFs include any one or more of a User Plane Function (UPF), a Session Management Function (SMF), a Network Exposure Function (NEF), an Application Function (AF), a Unified Data Management (UDM), or a User Data Repository (UDR).

20. A host configured to operate in a communication system to provide an over-the-top (OTT) service, the host comprising:
processing circuitry configured to provide user data; and
a network interface configured to initiate transmission of the user data to a cellular network for transmission to a user equipment (UE),
wherein the UE comprises a communication interface and processing circuitry to receive the user data from the host.

21. The host of the previous embodiment, wherein cellular network further includes one or more network nodes configured to carry out any of the Group A embodiments, in conjunction with providing user data from the host to the UE via VLAN routing through a logical bridge provided by the cellular network.

22. The host of the previous 2 embodiments, wherein:
the processing circuitry of the host is configured to execute a host application, thereby providing the user data; and the host application is configured to interact with a client application executing on the UE, the client application being associated with the host application.

23. A host configured to operate in a communication system to provide an over-the-top (OTT) service, the host comprising:
processing circuitry configured to provide user data; and
a network interface configured to initiate transmission of the user data to a cellular network for transmission to a user equipment (UE),
wherein the UE comprises a communication interface and processing circuitry, the communication interface and processing circuitry of the UE being configured to transmit the user data to the host.

24. The host of the previous embodiment, wherein the cellular network further includes a network node configured to communicate with the UE to transmit the user data from the UE to the host, based on routing the data according to a VLAN configuration implemented by a logical bridge provided by the cellular network.

25. The host of the previous 2 embodiments, wherein the processing circuitry of the host is configured to execute a host application, thereby providing the user data, and the host application is configured to interact with a client application executing on the UE, the client application being associated with the host application.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method performed by one or more network functions (NFs) of a telecommunication network comprising a Fifth Generation System (5GS), the method comprising:
a User Plane Function (UPF), as one of the one or more NFs, providing dynamic Virtual Local Area Network (VLAN) configuration for Ethernet bridging provided by the UPF providing an Ethernet bridging function, based on:
receiving a VLAN ID (VID) from a Session Management Function (SMF), for a User Equipment (UE) establishing or modifying an Ethernet Protocol Data Unit (PDU) session; and
responsive to the received VID being a predefined VID, running Multiple VLAN Registration Protocol (MVRP) for the UE, to learn VIDs of VLANs associated with the UE, and performing bridging operations for Ethernet traffic associated with the UE according to the learned VIDs.

2. The method according to claim 1, wherein, for a case where MVRP results indicate that the UE is a trunk port for multiple VLANs having respective VIDs, the UPF stores the learned VIDs and provides bridging services with respect to the UE only for those Ethernet frames associated with one of the learned VIDs.

3. The method according to claim 1, wherein for a case where MVRP results indicate that the UE is associated with a single VLAN, the UPF treats the UE as a virtual Access Port (vAP) associated with a single VLAN and provides corresponding bridging services using the learned VID of the single VLAN.

4. The method according to claim 1, further comprising, responsive to the received VID not being the predefined VID, treating the UE as a virtual Access Port (vAP) associated with a single VLAN and providing corresponding bridging services using the received VID as the VID of the single LAN.

5. The method according to claim 1, wherein the SMF comprises one of the one or more NFs, and wherein the method further comprises the SMF obtaining the VID sent to the UPF from a User Data Management (UDM)/User Data Repository (UDR) of the telecommunication network.

6. The method according to claim 5, wherein the UDM/UDR are ones among the one or more NFs, and wherein the UDM/UDR receive the VID as part of VLAN configuration information generated by an Application Function (AF) and provided to the UDM/UDR by a Network Exposure Function (NEF) of the telecommunication network.

7. The method according to claim 5, wherein the AF comprises one among the one or more NFs, and the method further comprises the AF using a group management Application Programming Interface (API) to generate the VLAN configuration information provided to the UDM/UDR, via the NEF, the VLAN configuration information defining one or more VLAN groups having respective VIDs, with each VID being translated into an External Group ID serving as an identifier for a 5G VN group, and wherein the method comprises:

assigning non-predefined VIDs and External Group IDs for VLAN groups associated with UEs acting as virtual Access Ports (vAPs) for corresponding single VLANs; and assigning predefined VIDs and External Group IDs for VLAN groups associated with UEs acting as trunk ports.

8. The method according to claim 1, wherein, when N6 or N19 interfaces of the UPF act as trunk ports, the method further comprises the UPF using MVRP to learn VIDs of VLANs associated with the trunk ports, and store the learned VIDs at the UPF, for use in performing bridging operations for the trunk ports.

9. The method according to claim 7, further comprising the UPF maintaining a VLAN table for UEs and N6 and N19 interfaces.

10. A Fifth Generation System (5GS) comprising a network node (40) that includes:

communication interface circuitry; and processing circuitry operatively associated with the communication interface circuitry and configured to operate the network node as a User Plane Function (UPF) of the 5GS, the UPF providing dynamic Virtual Local Area Network (VLAN) configuration for Ethernet bridging provided by the UPF, based on the UPF being configured to:

receive a VLAN ID (VID) from a Session Management Function (SMF), for a User Equipment (UE) establishing or modifying an Ethernet Protocol Data Unit (PDU) session; and responsive to the received VID being a predefined VID, run Multiple VLAN Registration Protocol (MVRP)

for the UE, to learn VIDs of VLANs associated with the UE, and perform bridging operations for Ethernet traffic associated with the UE according to the learned VIDs.

11. The 5GS according to claim 10, wherein, for a case where MVRP results indicate that the UE is a trunk port for multiple VLANs having respective VIDs, the UPF is configured to store the learned VIDs and provide bridging services with respect to the UE only for those Ethernet frames associated with one of the learned VIDs.

12. The 5GS according to claim 10, wherein for a case where MVRP results indicate that the UE is associated with a single VLAN, the UPF is configured to treat the UE as a virtual Access Port (vAP) associated with a single VLAN and provide corresponding bridging services using the learned VID of the single VLAN.

13. The 5GS according to claim 10, wherein the UPF is configured to treat the UE as a virtual Access Port (vAP) associated with a single VLAN, in response to the received VID not being the predefined VID and provide corresponding bridging services using the received VID as the VID of the single VLAN.

14. The 5GS according to claim 10, wherein the 5GS further comprises a network node comprising processing circuitry configured to operate as the SMF, and wherein the SMF is configured to obtain the VID sent to the UPF from a User Data Management (UDM)/User Data Repository (UDR) of the 5GS.

15. The 5GS according to claim 14, further comprising one or more network nodes comprising processing circuitry configured to operate as the UDM/UDR, and wherein the UDM/UDR is configured to receive the VID as part of VLAN configuration information generated by an Application Function (AF) and provided to the UDM/UDR by a Network Exposure Function (NEF) of the 5GS.

16. The 5GS according to claim 15, wherein the 5GS further comprises a network node comprising processing circuitry configured to operate as the AF, and wherein the AF is configured to use a group management Application Programming Interface (API) to generate the VLAN configuration information provided to the UDM/UDR, via the NEF, the VLAN configuration information defining one or more VLAN groups having respective VIDs, with each VID being translated into an External Group ID serving as an identifier for a 5G VN group, and wherein the AF is configured to:

assign non-predefined VIDs and External Group IDs for VLAN groups associated with UEs acting as virtual Access Ports (vAPs) for corresponding single VLANs; and assign predefined VIDs and External Group IDs for VLAN groups associated with UEs acting as trunk ports.

17. The 5GS according to claim 10, wherein, with respect to N6 or N19 interfaces of the UPF acting as trunk ports, the UPF is configured to use MVRP to learn VIDs of VLANs associated with the trunk ports, and store the learned VIDs at the UPF, for use in performing bridging operations for the trunk ports.

18. The 5GS according to claim 17, further comprising the UPF maintaining a VLAN table for UEs and N6 and N19 interfaces.

* * * * *